UNITED STATES PATENT OFFICE.

CALEB G. COLLINS, OF NEW YORK, N. Y., ASSIGNOR TO CALVIN AMORY STEVENS, OF SAME PLACE.

PROCESS OF MAKING PAINT.

SPECIFICATION forming part of Letters Patent No. 666,302, dated January 22, 1901.

Application filed April 12, 1900. Serial No. 12,627. (No specimens.)

*To all whom it may concern:*

Be it known that I, CALEB G. COLLINS, a citizen of the United States, residing at New York, (Woodmere,) Queens county, and State of New York, have invented certain new and useful Improvements in Processes of Making Paint, of which the following is a specification sufficient to enable others skilled in the art to which the invention appertains to make and use the same.

The object of my invention is to combine soluble coloring-matter, such as coal-tar or anilin dye, with silica or silicic acid in a finely-divided condition; and it consists in precipitating a hydrated silica or silicic acid by electrolytic dissociation of a soluble silicate, such as sodium silicate, in the presence of a solution containing a dye salt.

It is obvious that the finely-subdivided silica precipitated by electrolytic action in the presence of the dye-salt solution becomes thoroughly saturated in its minute particles as it is freshly generated, and is thus more thoroughly impregnated with the color than would be possible by rapid chemical precipitation. When sodium-silicate solution is employed, the soda of the silicate solution is separated at the negative electrode, leaving freshly-precipitated silica in an insoluble state, which at the instant of its formation in the insoluble condition seizes the coloring-matter in the solution to form an extremely intimate and insoluble combination of silica and the color.

The anode in this process may consist of any insoluble conductor, as the hydrated silicic acid set free at the anode effectually prevents the corrosion of the positive electrode.

Permanence and durability of paints produced by this process render the invention of importance and utility in a commercial sense.

It is to be understood that I do not confine myself to any particular combination of dye with the silica, as it may be varied indefinitely without departing from the spirit and intent of my invention so long as the compound from which the silica is derived is dissociated by electrolysis.

The coloring solution may be made strong as compared with the amount of silica to be deposited therein, thus affording a highly-concentrated pigment for mixture with other vehicles or paints, or the silica may be combined in such proportion with the coloring-matter as to constitute a paint for actual use. In either case the color is fixed and permanent.

In carrying out my invention in a commercial way I produce a solution, preferably, of sodium silicate and a solution of an anilin dye salt, such as the potash salt of tetra-bromo-fluorescein, (eosin red,)

$$C_6H_4(CO.C_6HBr_2OK)_2O$$

and convey the same into a reservoir from which the silica is being deposited by electrolytic action continuously to resupply the bath with fresh silicate and dye salt as the same becomes depleted by precipitation of the pigment.

I am aware that insoluble oxids have been produced on the surface of an anode by the action of free oxygen liberated by electrolysis at that point on the same and that various dyes have been introduced into the liquid surrounding said anode for the purpose of coloring the oxid thus chemically produced by secondary reaction. It can be readily seen, however, that the production of such oxid upon the anode is purely superficial and cannot be carried on to any considerable extent, as the superficial coating of oxid eventually prevents further action and naturally cannot be considered a commercial process. In my process the oxid or paint-body is not produced by secondary chemical action upon the non-metallic anode, but the non-metallic base in soluble combination is actually in solution and the insoluble non-metallic compound or paint-body is thrown down from its solution containing the dyes in a finely-comminuted condition by dissociation, withdrawal, or abstraction of the alkali, allowing the compound, which is insoluble, to be thrown out of the solution, in which condition it rapidly absorbs the dyes or color.

I am also aware that processes have been devised whereby the paint base or body is derived wholly from the electrodes by corroding, dissolving, or otherwise transforming the same into a soluble compound and naturally disintegrating and destroying the same, thereby requiring substitution of new electrodes from time to time. The electrodes being of more or less expensive character and their decomposition being slow and tedious, it is obvious that processes dependent upon this source of supply or generation of paint-body could not be employed practically in a commercial sense.

It is obvious that my process can be carried on continuously without material deterioration of either anode or cathode, the chemicals to be dissociated being added from time to time as the paint-body and color are precipitated and the products of dissociation withdrawn. The dye is also added from time to time to strengthen the depleted solution, thereby maintaining a uniformly-colored precipitate.

It will be readily seen that in the production of paint-bodies from soluble salts by my process, as hereinbefore set forth, it would be impracticable to employ an anode from which the solution could be regenerated by corroding, dissolving, or otherwise transforming the same into a soluble compound, for the reason that silicon could not be employed. Hence an insoluble anode is an essential feature in my process.

The term "paint-body" as used throughout the specification and claim is intended to imply an insoluble color vehicle or medium which forms the base or body containing the dye.

What I claim as my invention, and desire to secure by Letters Patent, is—

The process of making pigments which consists in producing a solution of an alkali-metal silicate, introducing into the same a dye salt, and passing an electric current therethrough thereby subjecting said mixture to electrolytic dissociation, thus precipitating silica or silicic acid together with a dye salt substantially as described.

CALEB G. COLLINS.

Witnesses:
  D. W. GARDNER,
  GEO. WM. MIATT.